Oct. 29, 1935. J. REID 2,019,463
COUPLING ORGANIZATION FOR A CROSSHEAD AND PISTON ROD
Filed March 20, 1935
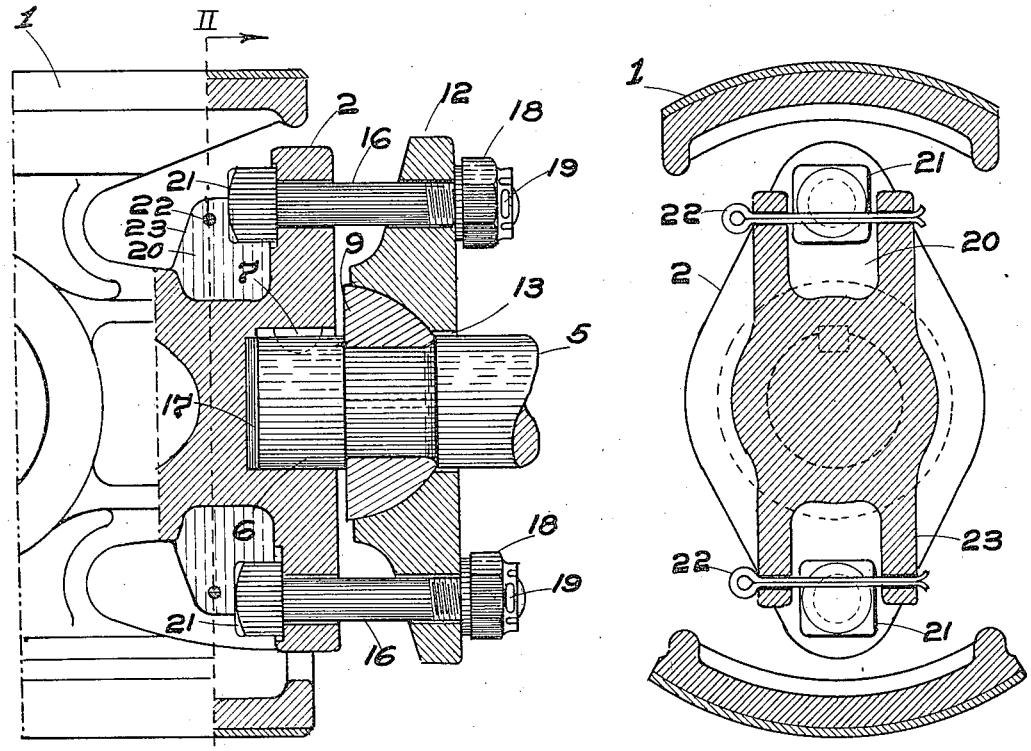
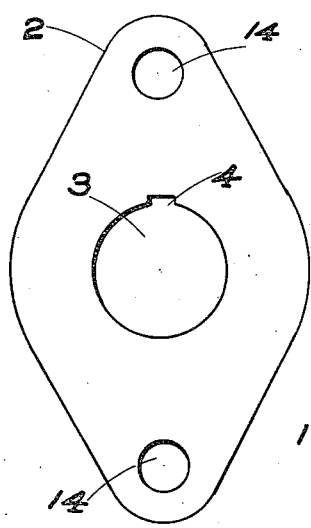
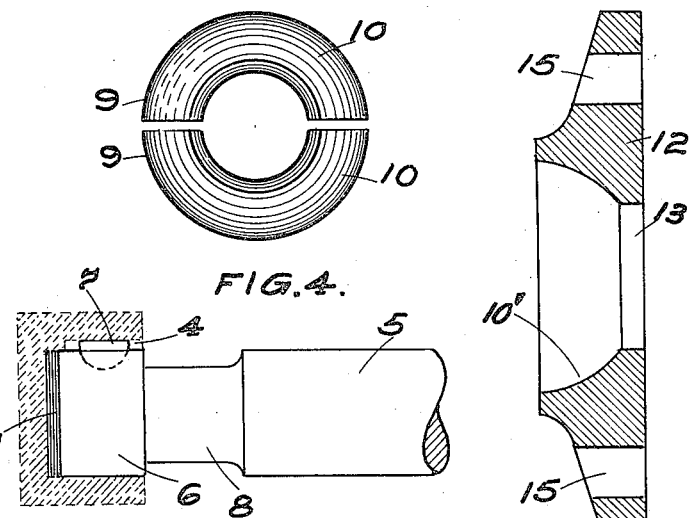
FIG.1. FIG.2.
FIG.3. FIG.4. FIG.5. FIG.6.
INVENTOR
JOHN REID
BY
Edward R. Jorman
ATTORNEY Patented Oct. 29, 1935

2,019,463

UNITED STATES PATENT OFFICE 2,019,463

COUPLING ORGANIZATION FOR A CROSSHEAD AND PISTON ROD

John Reid, Oil City, Pa., assignor to Joseph Reid Gas Engine Company, Oil City, Pa., a corporation of Pennsylvania Application March 20, 1935, Serial No. 11,947

5 Claims. (Cl. 287—20)

This invention relates to a coupling organization whereby the adjacent end of a piston rod is connected to the crosshead of an engine; it is intended for use especially in connection with internal combustion engines of the two-stroke-cycle type, which employ a trunk piston that is rigidly secured to the piston rod; in this type of engine, the combustion chamber end of the piston is usually supplied with a deflector which is so related to a piston-controlled fuel-inlet port through the cylinder wall that the entering charge of air or fuel mixture, as the case may be, is deflected to or toward the rearward end of the cylinder; in an engine of this construction, the piston must always occupy a certain position, circumferentially considered, within the bore of the cylinder, in order that the deflector may be in proper relation to the port with which it coacts; it is also necessary that the piston should occupy the proper terminal positions longitudinally of the cylinder at the respective ends of its stroke for the attainment of proper compression pressures, and for other reasons well known to those skilled in the construction, operation and maintenance of internal combustion engines, and more especially engines of the Diesel type.

Heretofore the type of coupling organization generally employed for connecting the piston rod to the crosshead has been of the screw-threaded type, consisting of a thread upon the end of the rod, and a tapped hole in the crosshead for the reception thereof; such threadwork is usually several inches in length; ten threads per inch is a commonly employed pitch; in making this screwed connection it is necessary to turn the piston with the rod, and in making subsequent adjustments, in order to relocate the piston deflector in its proper position in relation to the port with which it is associated, one full revolution of the piston must be made; it will thus be seen that, in making longitudinal adjustments of the piston to attain variation of compression, it is necessary to adjust to an extent of one tenth of an inch, or multiples thereof. In such cases, in order to insure the correct re-location of the deflector after making adjustments, it is a common practice to mill a spline longitudinally of the thread upon the rod and to drill and tap the crosshead for the insertion of a pivot point set screw to be forced down into the flat of the spline; in doing this, a careless workman in making adjustments can destroy the rod by not stopping the spline in proper alignment with the set screw, then embedding the point of the set screw in the thread of the rod.

Among the many objections which inhere in this type of joint, the following may be mentioned:

It is a difficult and exacting piece of mechanical work to tap a hole several inches deep so that the thread, at some portion of its length, will not be distorted as to lead, and this will produce a poor and troublesome initial fit.

These long threads make for slow assembly, and especially so because the whole piston, which is now within the bore of the cylinder must be turned with the rod.

The piston must be inspected at intervals, and for this purpose its removal from the cylinder is necessary; the uncoupling and recoupling of the screw joint for this purpose consumes much time and a consequent long shutdown and disuse of the engine.

The withdrawal of the piston rod and its threaded portion through the stuffing box causes injury to result to both the thread and the stuffing box which may result in loss of compression in the pump chamber, and the replacement of the rod or box.

It is therefore the object of this invention to produce a coupling or joint organization for crossheads and piston rods from which all the objections mentioned shall be eliminated and in other respects to produce a more facile, economical, and efficient joint organization.

The construction whereby said objects are attained is clearly illustrated in the accompanying drawing, set forth in the accompanying specification, and succinctly defined in the appended claims:

In the drawing:

Fig. 1 is a side elevation of the rearward portion of a crosshead, the rearward end of which, together with the coupling organization, is shown in central, vertical, longitudinal section.

Fig. 2 is a transverse section on line II—II of Fig. 1, looking in the direction indicated by the rearwardly-pointing arrows.

Fig. 3 is a face elevation of that portion of the crosshead which is herein termed the attaching flange.

Fig. 4 is an elevation of an element which is herein termed the split collar.

Fig. 5 is a side view of the forward end of the piston rod.

Fig. 6 is a vertical central section through the member which is herein termed the securing clamp.

Important elements of this invention, termed the adjusting shims, are not shown in detail, but they are clearly illustrated in their assembled relation in Figs. 1 and 5, and their object and construction are clearly described in the specification.

Throughout the following specification and claims the term "forward" signifies toward the crank end of the engine and the term "rearward" signifies toward the cylinder end.

The construction illustrated in said drawing is substantially as follows:

The rearward portion of a crosshead body 1 is shown in Fig. 1; the rearward portion of this view is shown in central vertical section; the rearward end of the crosshead is provided with a rod attaching flange 2; a rearward view of this flange is shown in Fig. 2, and a face view of same is shown in Fig. 3.

An axially-aligned socket 3 is formed and extends into the rearward face of said attaching flange; this socket is provided with a keyway 4, whereby non-revolubility of the rod 5 and the thereto rigidly attached piston is positively secured. Said rod is reduced in diameter at 8, whereby said head is formed, together with a reduced neck, for engagement by the bore of a diametrically-split annulus or collar, consisting of the two sections 9, 9, as shown in Fig. 4; one face of this collar is straight for contact with the said head 6, and its opposite face is formed into the shape of a spherical zone 10, 10, for contact with and compressive engagement by a counterpart seat 10' in the inner face of securing clamp 12, as shown in Fig. 6; said counterpart seat is concentric with the bore 13 of said flange 12, through which the piston rod passes, as shown in Fig. 1.

Bolt-holes 14 are provided in the flange 2, and the securing clamp 12 is provided with bolt-holes 15, for the reception of tension bolts 16 which are carried by said attaching flange.

Adjustment shims 17, of any desired thickness or number are inserted into socket 3 and arranged in contact with the inner vertical wall thereof; these shims are preferably composed of thin metal for contact with, and the substantially micrometric positioning,—longitudinally—, of the contacting face of the adjacent end of the piston rod 5, and consequently the piston itself within the cylinder of the engine, whereby any desired degree of longitudinal adjustment of the piston and consequent compression of the fuel charge may be had, since it is readily seen that there is no practical limit to the thickness, or thinness, of the shims 17 which may be employed, even down to one-thousandth of an inch; care is always taken to make the depth of socket 3 sufficient so that several shims 17 may be initially employed, and thereafter one or more may be added or removed as conditions may require, and in respect to this possibility, it will be noted by inspection of Fig. 1, that the adjacent faces of the split collar 9 and flange 2 stand in spaced relation for the purpose of facilitating longitudinal adjustments of said rod 5.

This coupling organization is assembled in the following manner:

This piston with its rod is placed in the engine so that the end of the piston rod is in proximity to the adjacent end of the crosshead; the securing clamp 12 is then placed upon the projecting end of the rod; the split collar is then placed upon the neck of the rod, and the securing clamp is placed in engagement therewith; the key 7 is placed in its seat and shims 17, to the required number, are placed in the socket 3; the adjacent end or head of the rod is then introduced into said socket preferably by a rearward movement of the crosshead, and the tension bolts 16 are then inserted through the holes provided for the reception of same, whereupon the necessary degree of tension is exerted upon said bolts by means of the nuts 18; these are castellated nuts, and are secured in position by means of cotter pins 19.

In order to insure nonrevolubility of bolts 16, as nuts 17 are being turned, a recess 20 is provided in the forward face of flange 2 for the heads 21; the width of said recess is such as to prevent said heads from turning.

Accidental displacement of said bolts is prevented by the cotters 22, which extend through the recess walls 23 and across said recess.

I claim the following:

1. A coupling organization for a crosshead and piston rod for engines comprising in combination; a crosshead having at the rearward end thereof a concentrically located attaching flange having an axially aligned socket extending into the rearward face thereof; a piston rod formed at its crosshead end into a head adapted for non-revoluble insertion into and occupancy of said socket, said rod being reduced in diameter adjacent to said head to form a neck; a diametrically split collar arranged in engagement with said rod at said neck, the rearward face of said collar having the conformation of a spherical zone; a securing clamp provided with a concentrically positioned hole for the passage of said piston rod therethrough and a concentric cup or seat having counterpart seating walls in conformity with said spherical zone formation of said collar; and tension means carried by said crosshead in engagement with, and adapted to cause compressive action of said clamp upon, the hemispherical zone face of said collar and the consequent rigid joining of said rod to said crosshead.

2. A coupling organization for a crosshead and a piston rod comprising in combination a crosshead body having at the rearward end thereof a concentrically located attaching flange into which an axially aligned socket extends; a piston rod formed at its crosshead end into a head for nonrevoluble insertion into and occupancy of said socket, said nonrevolubility being attained by a cooperating key and seat therefor formed in and/or carried by said socket and rod respectively; said rod being formed adjacent to said head into a diametrically reduced zone forming a neck; a diametrically split collar engaging said rod at said neck, the rearward face of said collar having the conformation of a spherical zone; a securing clamp provided with a centrally-located hole for the passage of said piston rod therethrough and having a cup-like seat formed concentrically with said hole in the side of said clamp which is adjacent to said head, the walls of said seat being a counterpart of and contacting with the spherical zone face of said collar, and tension means carried by said crosshead in engagement with said clamp whereby the assembly of said coupling organization is maintained.

3. A coupling organization for a crosshead and a piston rod comprising in combination a crosshead formed at the rearward end thereof into a concentrically located attaching flange having an axially-aligned socket extending into the rearward face thereof; a piston rod formed at its crosshead end into a head adapted for nonrevoluble insertion into and occupancy of said socket, said rod being formed adjacent to said head into a diametrically reduced zone forming a neck; a diametrically split collar engaging said rod at said neck, the rearward face of said collar having the conformation of a spherical zone and a central opening which in dimension and form is a counterpart of said neck; a securing clamp provided with a concentrically located hole for the passage of said piston rod therethrough, there being within the forward face of said clamp, in concentric relation to said hole, a cup-like seat the walls of which are a counterpart of the spherical zone face of said collar and adapted for contact with and compressive action thereupon; and tension means carried by said crosshead in engagement with said clamp adapted to cause said compressive action whereby the proper relation and rigid assembly of the members of said organization are respectively caused and maintained.

4. A coupling organization for a crosshead and a piston rod comprising in combination, a crosshead having at the rearward end thereof a unitary, concentrically positioned attaching flange having an axially aligned socket extending into the rearward face thereof adapted for the nonrevoluble reception of the end of the piston rod; a piston rod formed at its crosshead end for nonrevoluble insertion into and occupancy of said socket, said rod being provided with a neck adjacent to said head; a diametrically-split collar engaging said rod at said neck, the rearward face of said collar having the conformation of a spherical zone; a securing clamp provided with a concentrically-positioned hole for the passage of said rod therethrough, and provided upon its forward face, in concentric relation to said hole, with a cup-like seat the walls of which are a counterpart of and adapted for compressive contact with said spherical face of said collar; and bolts carried by said attaching flange for engagement with said clamp, whereby a rigid assembly of the elements of said coupling is produced.

5. A coupling organization for a cooperating piston rod and crosshead, comprising in combination; a crosshead having at the rearward end thereof an integrally-formed, concentrically positioned attaching flange provided with an axially aligned socket extending into the rearward face of said flange adapted for the non-revoluble reception of the adjacent end of said rod; shims positioned within said socket in contact with the inner vertical wall thereof; a piston rod formed at its adjacent end into a head for nonrevoluble insertion into and occupancy of said socket with its end face in contact with said shims, said rod being reduced in diameter adjacent to said head to form a neck; a diametrically-split collar engaging said neck, the rearward face of said collar having the conformation of a spherical zone; a securing clamp provided with a concentrically-positioned hole for the passage of said piston rod therethrough and a cup-like seat formed in the forward face of said flange concentrically with said hole, the walls of said seat being in conformity to the spherical face of said collar for compressive and retaining contact therewith; and interengaging means between said flange and said clamp adapted to cause the firm and compressive engagement of said clamp with said collar.

JOHN REID.